United States Patent [19]

Enderle et al.

[11] Patent Number: 5,018,280
[45] Date of Patent: * May 28, 1991

[54] METHOD AND DEVICE FOR THE OPERATION OF A WORKPIECE-CONTACTING PROBE HEAD OF THE SWITCHING TYPE

[75] Inventors: Eckhard Enderle, Aalen-Dewangen; Hans-Peter Aehnelt, Oberkochen; Karl-Eugen Aubele, Gussenstadt; Michael Wirth, Aalen, all of Fed. Rep. of Germany

[73] Assignee: Carl-Zeiss-Stiftung, Heidenheim/Brenz, Oberkochen, Fed. Rep. of Germany

[ * ] Notice: The portion of the term of this patent subsequent to Mar. 28, 2006 has been disclaimed.

[21] Appl. No.: 555,909

[22] Filed: Jul. 20, 1990

Related U.S. Application Data

[63] Continuation of Ser. No. 277,699, Nov. 30, 1988, abandoned, which is a continuation-in-part of Ser. No. 72,163, Jul. 10, 1987, Pat. No. 4,815,214.

[30] Foreign Application Priority Data

Jul. 20, 1988 [DE] Fed. Rep. of Germany ....... 3824548

[51] Int. Cl.$^5$ ............................................. G01B 7/28
[52] U.S. Cl. ....................................... 33/832; 33/561; 33/558; 33/503
[58] Field of Search ................. 33/561, 832, 558, 556, 33/557, 559, 560, 1 M, 503

[56] References Cited

U.S. PATENT DOCUMENTS

| 4,136,458 | 1/1979 | Bell et al. | 33/561 |
| 4,153,998 | 5/1979 | McMurtry | 33/559 |
| 4,166,291 | 8/1979 | Shupe | 104/7.2 |
| 4,177,568 | 12/1979 | Werner et al. | 33/561 |
| 4,532,713 | 8/1985 | Feichtinger | 33/832 |
| 4,637,119 | 1/1987 | Schneider et al. | 33/561 |
| 4,702,013 | 10/1987 | McMurtry | 33/558 |
| 4,763,417 | 8/1988 | Ernst | 33/832 |
| 4,769,919 | 9/1988 | Lloyd et al. | 33/558 |
| 4,780,961 | 11/1988 | Shelton et al. | 33/832 |
| 4,780,963 | 11/1988 | McMurtry | 33/558 |
| 4,815,214 | 3/1989 | Enderle et al. | 33/832 |

FOREIGN PATENT DOCUMENTS

| 0136778 | 4/1985 | European Pat. Off. . | |
| 0242710 | 10/1987 | European Pat. Off. . | |
| 2468875 | 5/1981 | Fed. Rep. of Germany . | |
| 1201667 | 12/1985 | U.S.S.R. | 33/558 |
| 2005022 | 4/1979 | United Kingdom . | |
| 2049198 | 12/1980 | United Kingdom | 33/561 |

Primary Examiner—William A. Cuchlinski, Jr.
Assistant Examiner—Diego F. F. Gutierrez
Attorney, Agent, or Firm—Hopgood, Calimafde, Kalil, Blaustein & Judlowe

[57] ABSTRACT

To overcome friction in the mount of the switching-type probe head, a probe (5/6) displaceably mounted therein is transiently excited in oscillation for a predetermined time after each contacting process. The same piezoelectric element (17) as that which produces the initial work-contact signal in the probe head can additionally be used to stimulate the oscillations.

15 Claims, 5 Drawing Sheets

METHOD AND DEVICE FOR THE OPERATION OF A WORKPIECE-CONTACTING PROBE HEAD OF THE SWITCHING TYPE

This application is a continuation of prior application Ser. No. 07/277,699, filed Nov. 30, 1988 now abandoned, and said prior application is a continuation-in-part of original application Ser. No. 07/072,163, filed July 10, 1987 now U.S. Pat. No. 4,815,214, issued Mar. 28, 1989.

BACKGROUND OF THE INVENTION

Probe heads used by coordinate-measuring instruments for measuring the three-dimensional coordinates of selected points of a workpiece can be divided into two categories, namely, into those of the "measuring" type and those of the so-called "switching" type. Probe heads of the measuring type produce a signal which is proportional to the deflection of their probe or probe pin; on the other hand, probe heads of the switching type produce a pulselike signal at the instant of probe contact with the workpiece which is to be measured. These switching-probe heads are generally so constructed that a biasing element urges a seating member (to which the probe pin is chucked) into a mount on the fixed part of the probe head, and the seating of this member in the mount unambiguously determines the zero position of the probe pin. In the work-contacting process, the probe deflects and lifts the seating member out of its mount, against the force of the biasing element, and the seated relation resumes upon loss of work contact, i.e., at termination of the contacting process. In known switching probes, the mount usually comprises a three-point support, wherein the seating member of the probe has three angularly spaced cylindrical arms, and wherein each of these arms has static seating engagement in a V-groove formed by a pair of balls in the mount, i.e., within the housing of the probe head. Probe heads having such a statically determined mounting are described, inter alia, in U.S. Pat. No. 4,153,998.

In some of the known probe heads, electrical contacts are provided in the seating locations, for the production of a work-contact signal However, it is also known to generate the contact pulse via a separate piezoelectric sensor. A probe head having such a sensor is described, for example, in U.S. Pat. No. 4,177,568.

In probe heads of the switching type, the precision with which the probe returns to its seated or zero position (i.e., after a work-contacting process) is to a considerable extent limited by friction in the seating of the probe in its mount. To reduce this friction, the seating locations are customarily greased or oiled. However, there remains a residual error by which the workcontact ball of the probe pin can deviate from its zero position. This error depends also on the length of the probe pin, the effective diameter of the seating base in the mount, and the biasing force which acts in the seating direction. In commercial probes, this seating error has values in the range of 0.2 to 0.5 micrometer.

Such a seating error can also occur, although to a lesser extent, in measuring-type probe heads, since the probe pin in a measuring-type probe head is also in some way mechanically form-locked in its zero position.

Greater deviations from the zero position can also occur sporadically. The case may even arise that electrical contacts in a switching-type probe head remain open. And it has been proposed to remedy such rare occurrences of error, by employing a device which applies a mechanical push to the probe pin when a seating contact has remained open. However, only the few such occurrences (which happen perhaps once in several thousand scanning processes) are eliminated by these measures, which are described in Federal Republic of Germany OS 3,623,614. General improvement in the precision of seated zero positioning thus cannot be obtained in this way.

Federal Republic of Germany AS 2,841,424 discloses a probe head having a piezoelectric oscillator which permits the free end of the probe to oscillate continuously with a small amplitude. This known probe head is so operated that a second, separate transducer detects the amplitude of the oscillation. It is then possible to recognize the condition of contact by the second transducer and to produce a corresponding signal, since the amplitude of probe oscillation is disturbed or damped as long as there is probe contact with the workpiece.

The problem of bearing friction and lack of restoring precision is not addressed in this German patent, it being merely indicated that a measurement precision of ±1 micrometer is achievable for this known probe head. However, for highly precise applications in coordinate measurement procedures, this measurement of uncertainty of ±1 micrometer is not sufficient.

BRIEF STATEMENT OF THE INVENTION

The object of the present invention is to provide a method and a means for operating probe heads of the switching type, whereby the zero or seated position of the probe can be reproduced with the greatest possible accuracy.

The invention makes use of the discovery that it is possible to overcome probe-seating friction if the probe is vibrated, to shake or jog it in its mount. In accordance with the invention, this shaking or jogging takes place after each contacting process; to this end, an electronic system is provided which, after each work-contacting process, supplies a-c excitation to a piezoelectric oscillator for a predetermined period of time.

The effectiveness of this measure is dependent on the oscillator frequency being at least in the vicinity of the natural mechanical frequency of the probe. Since the latter can change, for example, after replacing one probe with another, it is advantageous for a local frequency generator to supply a frequency spectrum, for example white noise, so that the natural mechanical frequency of the probe is always and in any event stimulated.

A particularly good reproduction of the zero position is obtained if the amplitude of the oscillation of the oscillator is so controlled that it dies out slowly after each excitation It is, of course, always possible to provide a separate piezoelectric oscillator for the purpose in question. But if the probe head already has a piezoelectric sensor for producing the contact signal, then it can also be used advantageously in reversed operation, i.e., as a driver for producing mechanical oscillation. This solution is particularly advantageous since it is then only necessary to intervene in the electronic system of the probe head, and to make no mechanical changes in the probe head itself By the indicated measures of the invention, error in the reproducibility of the zero position of a switching-type probe head can be reduced to values of less than 0.2 micrometers. Other advantages will become evident from the description which follows.

DETAILED DESCRIPTION

Two embodiments of the invention will be described in detail in conjunction with the accompanying drawings, in which.

Figure 1:
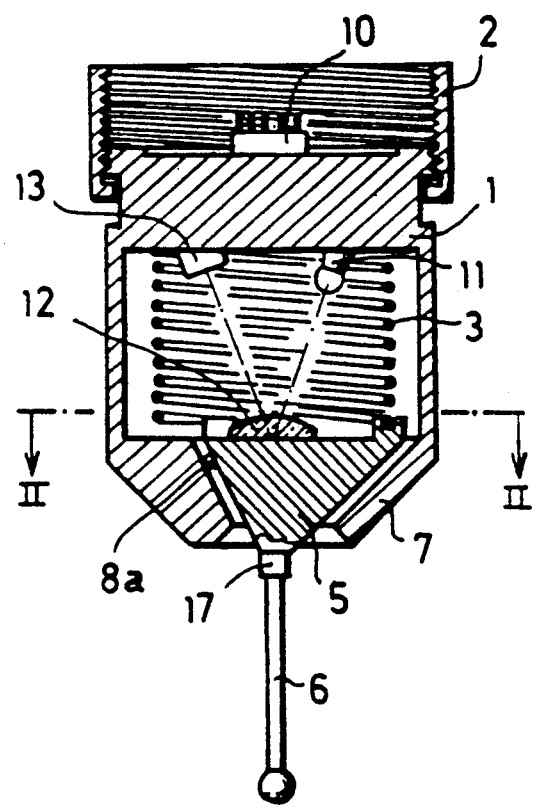
FIG. 1 is a simplified vertical section of a probe head of the switching type, in a plane containing the longitudinal axis of the probe.

The probe head of FIG. 1 has a cylindrical housing 1 which can be secured directly, by means of a cap nut 2 or via an extension piece, to the measurement arm of a coordinate-measuring instrument. At one end, the housing 1 is provided with a connector 10 having contact pins for making different electrical connections to the probe head.

At its opposite end, housing 1 tapers down conically, where its interior forms a mount 7 which accommodates the seating base or carrier 5 for the displaceable probe pin of the probe head. The seating base 5 which is held in the mount 7 is continuously urged by a spring 3 in the direction of its seated or zero position.

Figure 2:
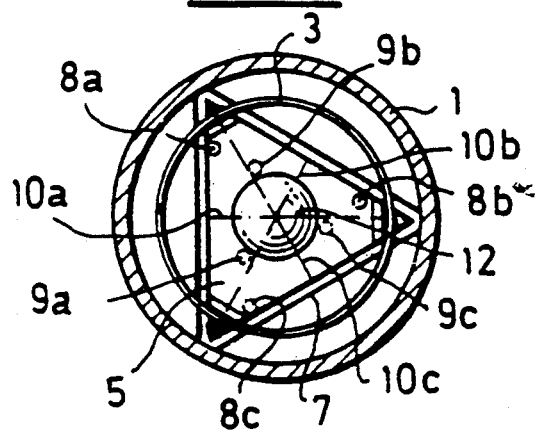
FIG. 2 is a transverse section of the probe head of FIG. 1, along the line II—II of FIG. 1.
Figure 3:
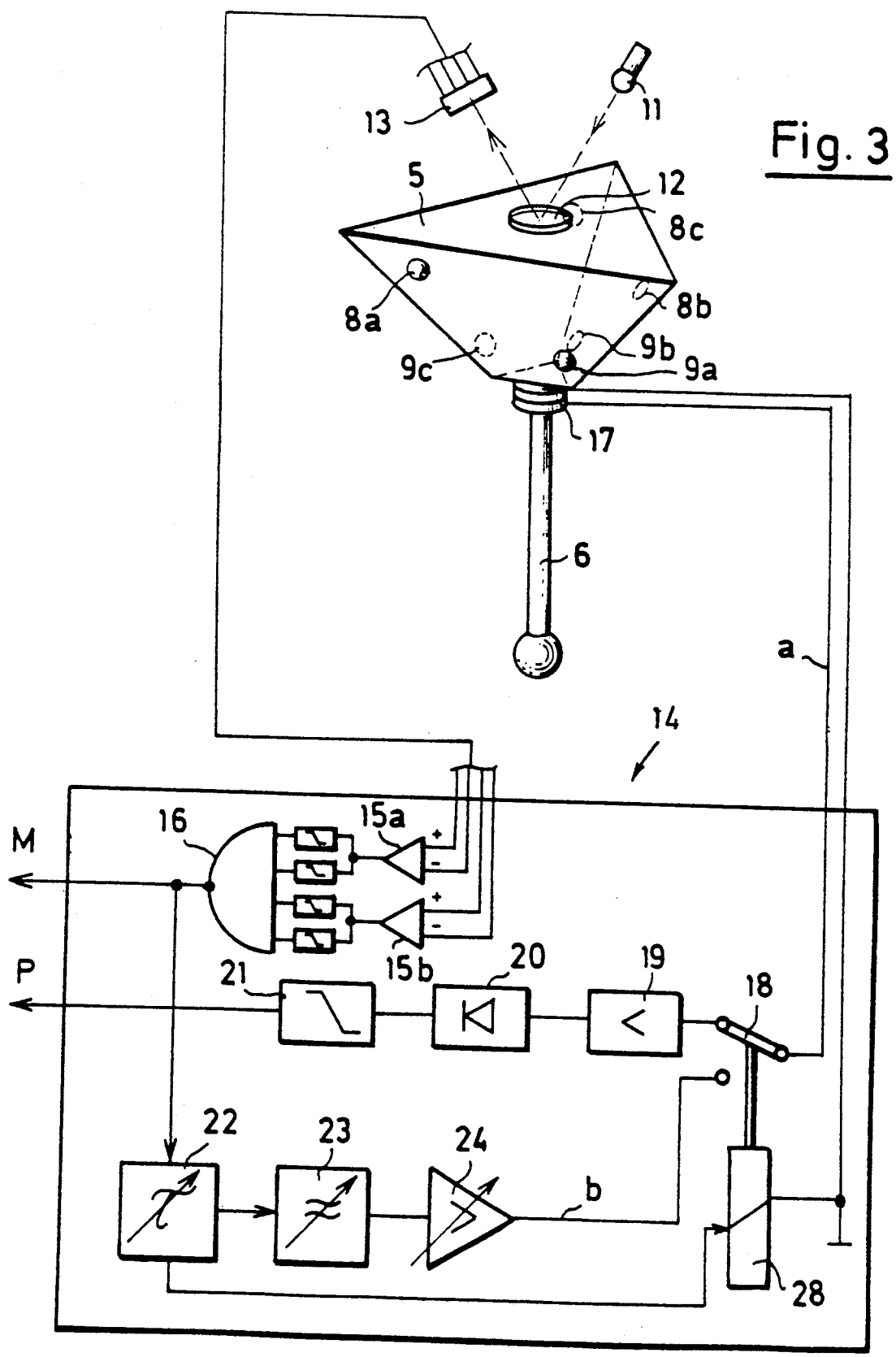
FIG. 3 is a simplified view in perspective of the displaceable probe (5/6) of FIG. 1, with an electronic system connected thereto.

As can be noted from the sectional view of FIG. 2 and from the perspective view of FIG. 3, the seating base 5 of the probe pin 6 has the shape of a truncated triangular pyramid which, in the zero position, engages at six discrete seating points on correspondingly shaped mating surfaces of the mount 7, in the lower part of housing 1. The seating points are established by convex features of the seating base 5, being designated (9a–c) and (8a–c) in FIGS. 2 and 3.

A more detailed description of the mount for the probe pin is given in the copending patent application entitled "Probe Head Mount for a Deflectable Probe or the Like", Ser. No. 07/227210, filed on 11/30/88, now U.S. Pat. No. 4,942,671.

The probe head of FIGS. 1 to 3 employs two sensors, for dependable recognition of initial probe contact with a workpiece, in the course of a contacting procedure which is unaffected by environmental vibrational and other factors. A first sensor 17 is piezoelectric and is connected between the seating base 5 and the pin 6 of the probe. This piezoelectric sensor 17 supplies, at the instant of probe-pin contact with the workpiece contact, a signal which serves to determine the measurement values at the instant of workpiece, it being understood that these measurement values are available from length-measuring devices on the respective guide systems of the coordinate-measuring instrument. A valid contact for measurement purposes is, however, only recognized as having occurred if the probe element 5/6 is actually also then lifted out of its zero position in the mount 7. For such recognition in the form shown, the second sensor comprises a light-emitting diode 11 and a four-quadrant photosensitive diode 13, the same being provided within the fixed housing 1 of the probe head, and a mirror-backed lens 12 is provided on the upper surface of the seating base 5 of the probe. Said lens images the luminous surface of the light-emitting diode 11 on the quadrant diode 13, and the signal of this device (13) serves to certify validity of the initial work-contact signal, namely, validity of the work-contact signal produced by the piezoelectric sensor 17 in the course of a contacting process. The length-measurement values determined at the instant when piezoelectric sensor 17 produces the initial work-contact signal are only recognized as contact coordinates and forwarded to the computer of the coordinate measuring instrument when a second signal, supplied by the device (11–13) follows the signal from sensor 17 within a predetermined period of time.

Figure 6:
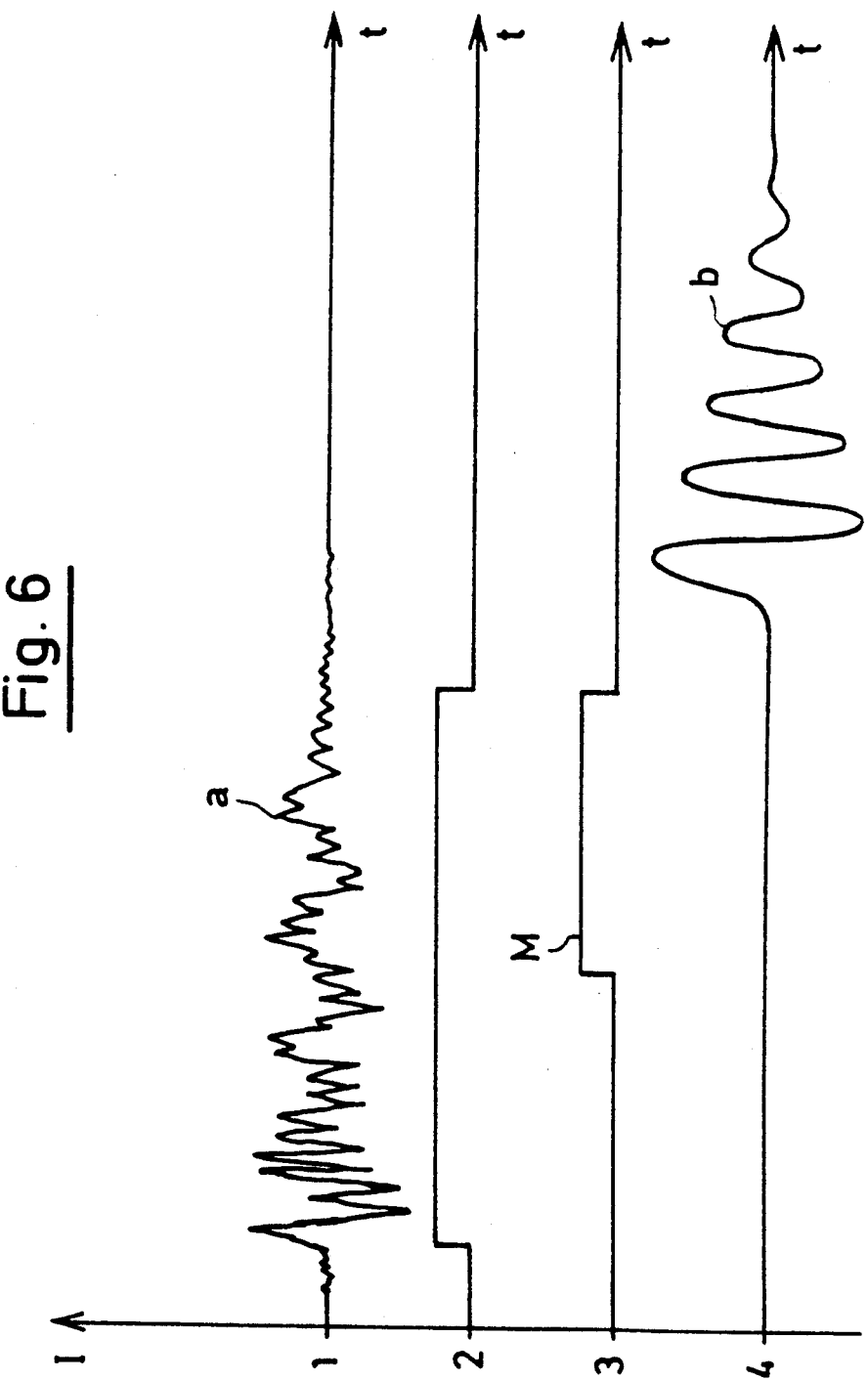
FIG. 6 is a graphical showing of time-variation for different signals in the electronic system of FIG. 3.

The electronic system in which the indicated two signals of the probe are processed is designated 14. The system contains an amplifier 19 to which the piezoelectric sensor 17 is connected via a switch 18. The output of amplifier 19 is fed to an integrating rectifier 20, the output of which is connected to a comparator 21 having a trigger threshold, adjusted to noise level by means suggested at 21. The comparator therefore supplies a signal P as soon as the signal of the piezoelectric sensor 17 exceeds noise level in the course of a contacting process. The work-contact signal generated by sensor 17 is marked "a" in graph 1 of FIG. 6; and the validating period within which to expect a signal output from the four-quadrant diode 13 is indicated by the gating signal at graph 2 of FIG. 6.

The four-quadrant diode 13 has discrete photosensitive areas which are arrayed in paired opposition, and each of these paired sensitive areas is connected to a different one of two difference amplifiers 15a, 15b, the outputs of which are connected to an "OR" gate 16. In this way, the signal designated "M" (graph 3 in FIG. 6) is produced as soon as the probe pin (5/6) is deflected to an extent causing the imaged light spot of photodiode 11 to travel out of its normally central position on the quadrant diode 13. The signal "M" is terminated upon time-out of the validation gate (graph 2 of FIG. 6).

Figure 5:
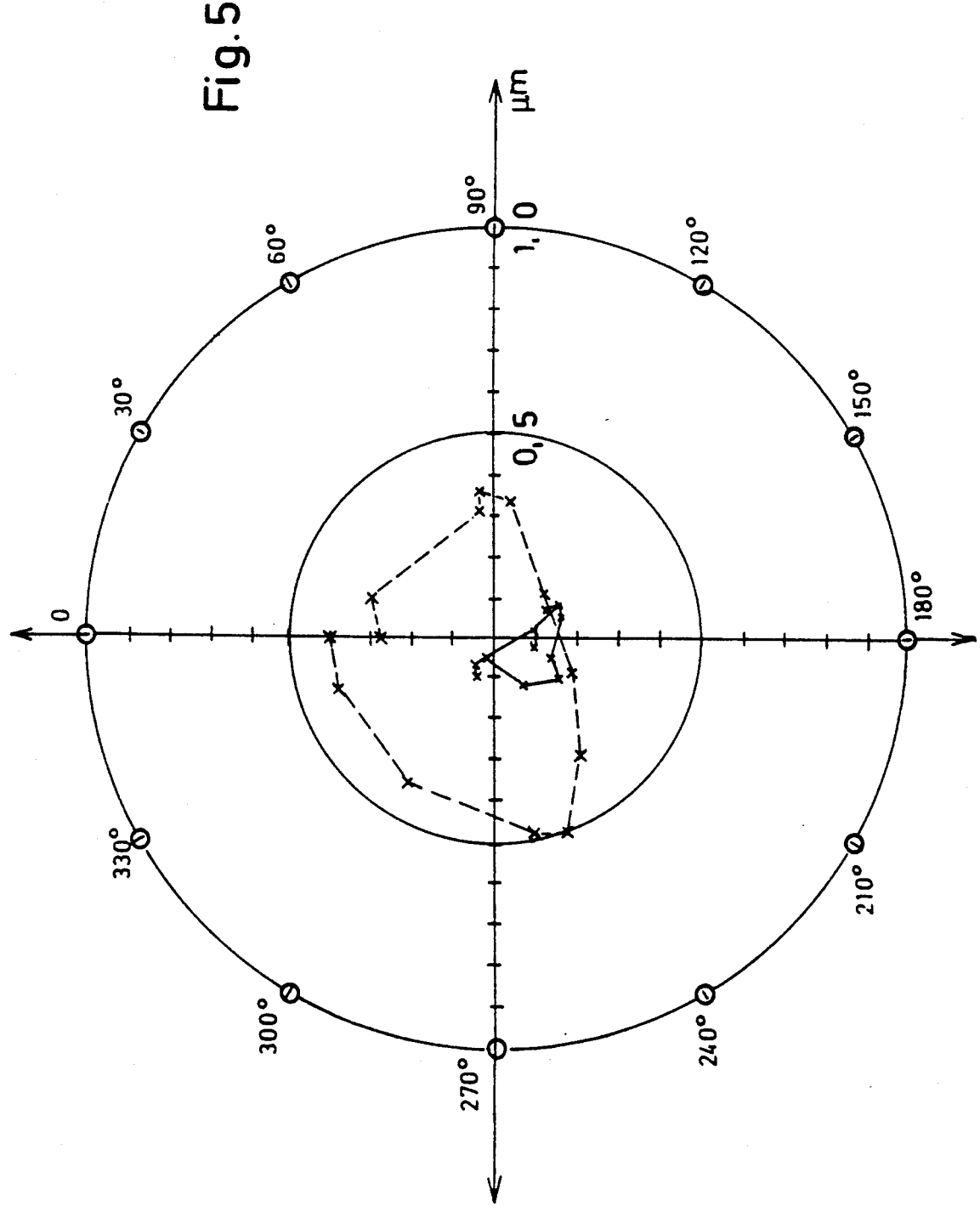
FIG. 5 is a test diagram to show positional reproducibility for the probe pin (6) of the probe head of FIGS. 1 to 3.

The test diagram of FIG. 5 shows the accuracy with which the movable probe part (5/6) of the probe head 1 returns to its "zero" position after a contacting process. For this test purpose, probe pin 5 was deflected in different azimuth-angle directions of work-contact deflection, in indexed steps of 30° in a plane perpendicular to the longitudinal axis of the probe pin. By means of an autocollimation telescope, the "zero" position assumed by the work-contact ball at the tip end of the probe pin was measured after completing the contacting process. The result is shown by a dashed line connecting the measurement points to each other in FIG. 5, and it can be clearly seen from the points connected by this dashed line that "zero"-position reproducibility of probe ball ranges between ±0.4 and ±0.5 μm. This series of dashed-line connected points represents prior-art performance.

To improve "zero"-position reproducibility, the electronic system 14 is additionally shown in FIG. 3 to employ a clock 22, controlled by the descending flank of the signal "M", and after an adjustable period of time following completion of a contacting process, to actuate a switch, shown in simplified form in FIG. 3 as a relay (28/18), thereby connecting an oscillator 23 for a short excitation time. Oscillator 23 is tuned to the natural mechanical frequency of probe 5/6, which is about 70 kHz for the described embodiment. The signal output of oscillator 23 is brought via an amplifier 24 to an amplitude of about 5 V, and is then sent, via switch contact 18 to the piezoelectric sensor 17 which then oscillates at this frequency of about 70 kHz and causes probe 5/6 to vibrate at its natural frequency. The time-variation of this oscillation is marked "b" in graph 4 of FIG. 6. It can be noted therefrom that the vibrations die away slowly after initial excitation by oscillator 23. The total period of time during which the probe pin oscillates is about 100 ms.

The mechanical vibrations induced by oscillator stimulation enable probe 5/6 to return with great accuracy to its zero position. The zero-position reproducibility of such a probe head (excited to vibration for a short time) is shown by the solid line in the diagram of FIG. 5, from which it is seen that the solid-line connected measurement points clearly lie within a range of ±0.2 μm. This can be explained by the fact that zero-position (seating) friction is reduced, as a result of oscillator-stimulated natural vibration, so that probe 5/6 reliably returns to its zero position with a precision which exceeds the non-stimulated case (dashed-line connected points) by a factor of 3.

Figure 4:
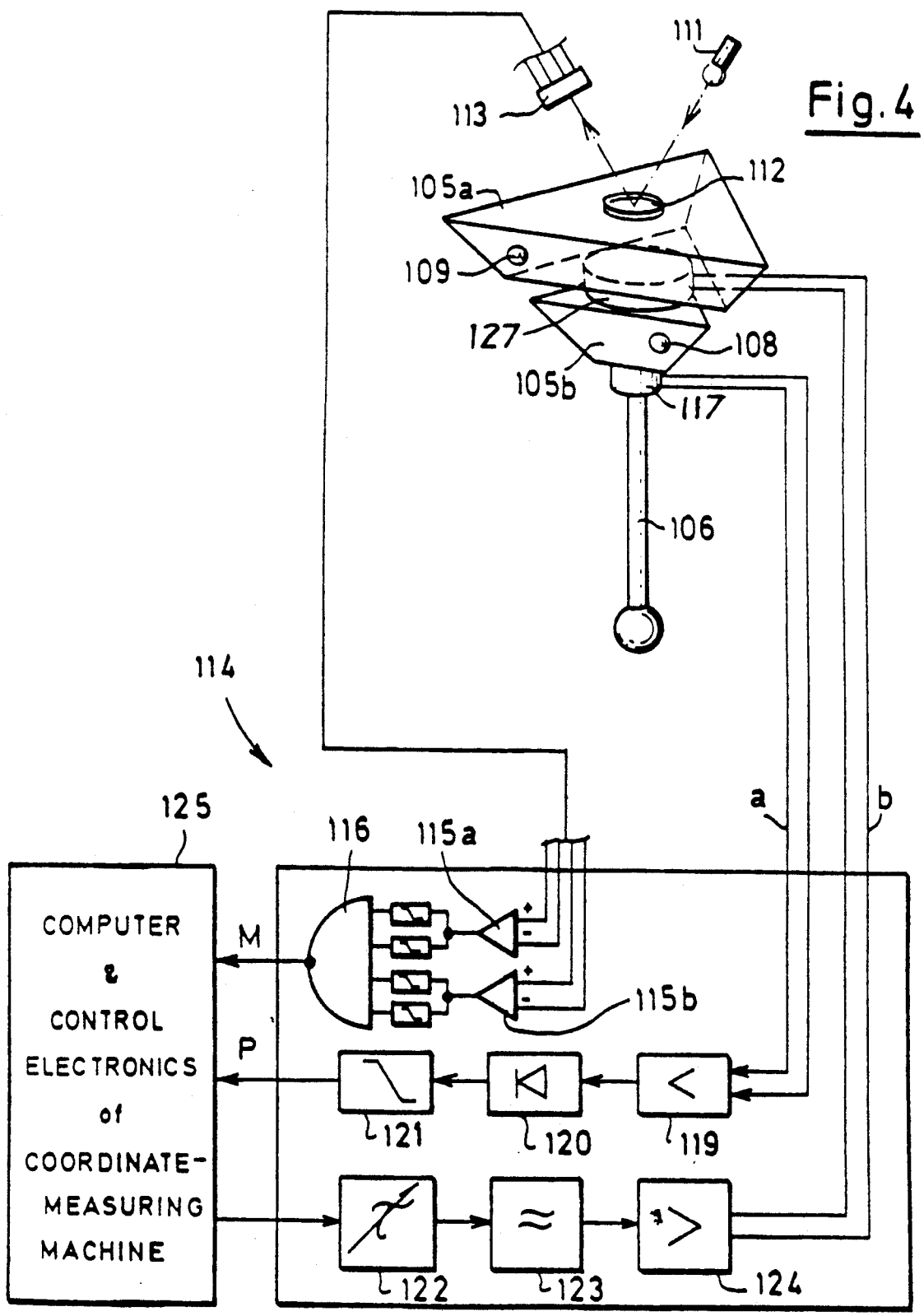
FIG. 4 is a diagram similar to FIG. 3 to show an alternative probe embodiment and an electronic system therefor.

FIG. 4 shows a slightly modified embodiment of the invention, wherein the seating base 105 of the probe is divided in two; and, in addition to the piezoelectric sensor 117, a second piezoelectric element 127 provides a fixed connection between and to the two halves (105a, 105b) of the seating base.

Signal processing for sensor 117 and for the photoelectric device 111, 112, 113 takes place in the same manner as in the embodiment of FIG. 3 and is therefore not described again; but the switching used to produce mechanical vibration is slightly modified. The clock 122 of the electronic system 114 receives its start signal from control electronics 125 of the coordinate-measuring instrument. The clock 122 connects an oscillator 123 for a predetermined period of excitation time, and oscillator 123 supplies a noise spectrum. This noise spectrum is so selected as to contain the various natural mechanical frequencies of a plurality of different interchangeable probes 105/106, in that different natural frequencies can be expected, after changing from one to another of the probe pins of such a plurality.

The noise-spectrum output of the oscillator 123 is sent, via amplifier 124, directly to the second piezoelectric element 127 which then allows probe (105/106) to vibrate after each contacting process and for a period of time determined by clock 122.

The advantage of the embodiment of FIG. 4 is, on the one hand, that one can operate with smaller amplitudes of oscillation as a result of the more effective delivery of mechanical oscillations to the seating base of the probe. Furthermore, the switch device 18/28 of FIG. 3 can be dispensed with, since each of the two piezoelectric elements 117, 127, is operated in only one mode, i.e., piezoelectric element 117 as a signal generator, and piezoelectric element 127 as an oscillator driver.

What is claimed is:

1. A device for operating a probe head having a displaceable probe which is so biased toward seating engagement with a fixed mount in the probe head as to define a zero position of the probe in the mount, said probe having piezoelectric means connected thereto for sensing initial probe contact with a workpiece, circuit means including an oscillator and an interval timer, said circuit means being connected to initiate a predetermined timing interval and upon lapse of said interval to excite said oscillator in transient driving relation with said piezoelectric means, said timing interval being sufficient to permit probe removal from workpiece contact prior to excitation of said oscillator.

2. The device of claim 1, wherein said piezoelectric means is a single transducer element serving sequentially in a first mode as a work-contact signal generator and in a second mode as a driver of the probe in mechanical oscillation.

3. The device of claim 1, wherein said piezoelectric means comprises two transducer elements, one of which is a signal generator responsive to probe contact with a workpiece, and the other of which is a driver of the probe in a natural mode of mechanical oscillation of the probe.

4. The device of claim 2 or claim 3, in which the probe head is of the variety which interchangeably mounts a selected one of a plurality of different probes, and in which said oscillator is a generator of a frequency spectrum which includes at least one mechanical resonance frequency of each probe of said plurality.

5. The device of claim 2, in which said circuit means includes switching means for sequentially connecting said transducer means for said respective modes in alternation with each other.

6. The device of claim 3, in which said probe comprises a two-part seating base having zero-position seating in aid mount, and in which said other transducer element is interposed between and mechanically coupled to each of the two parts of said seating base.

7. The device of claim 1, in which said oscillator is a generator of a frequency spectrum which includes at least one mechanical resonance, frequency of said probe.

8. The device of claim 1, in which the amplitude of oscillator output signal is controlled to diminish with time following initial excitation.

9. The improved method of operating a coordinate-measuring machine wherein (a) a probe head of the machine has a mount which deflectably mounts a work-contacting probe and the probe is continuously biased for seating in the mount to define a zero position of the probe and wherein the probe is piezoelectrically responsive to mechanical stress to sense initial probe contact with a workpiece, and (b) the machine performs a cycle of probe-head displacement to move the probe into and then away from workpiece contact, for each point to be measured on a workpiece, said improvement comprising the steps of generating an electrical signal, and using the generated signal to piezoelectrically excite the probe into oscillation which is sustained for a predetermined period of time in each cycle after the probe has moved away from contact with the workpiece.

10. The method of claim 9, wherein the probe has a natural frequency of mechanical resonance and wherein the generated electrical signal is characterized by a frequency spectrum which contains said natural frequency.

11. The method of claim 10, wherein the probe is one of a variety of different probes interchangeably mountable to the probe head, and wherein each probe has a different characteristic natural resonance frequency, the further improvement wherein the generated electrical signal is characterized by a frequency spectrum which spans the different natural frequencies of the different probes.

12. The method of claim 9, wherein the probe has a natural frequency of mechanical resonance and wherein the generated electrical signal is characterized by a noise spectrum which contains said natural frequency.

13. The method of claim 9, in which the electrical signal is so controlled in amplitude as to slowly reduce toward the end of each period of time.

14. The improved method of operating a coordinate-measuring machine wherein (a) a probe head of the machine deflectably mounts a workpiece-contacting probe and the probe is continuously biased for seated mounting to define a zero position of the probe and wherein the probe is electrically responsive to mechanical stress to sense initial probe contact with a workpiece, and (b) the machine performs a cycle of probe-head displacement to move the probe into and then away from workpiece contact, for each point to be measured on a workpiece, said improvement comprising the steps of generating an electrical signal and using the generated signal to electrically excite the probe into oscillating mechanical stress for a sustained predetermined period of time in each cycle after the probe has moved away from contact with the workpiece.

15. The method of operating a coordinate-measuring machine having a probe head with a mount which with respect to a "zero" position deflectably mounts a workpiece-contacting probe wherein the machine operates in a cycle of probe-head movement to displace the probe (a) in an advancing phase toward the workpiece until workpiece contact by the probe deflects the probe from seated relation in the mount and (b) in a withdrawing phase of probe retraction from workpiece contact and returning to the "probe" position in seated relation in the mount, there being a first piezoelectric element associated with the probe and responsive to generate a signal upon probe contact with the workpiece, and a second piezoelectric element associated with the probe to stimulate oscillating mechanical stress in the probe, said method comprising the steps of operatively using the first piezoelectric element only in making a measurement during said advancing phase, and operatively using the second piezoelectric element only to enhance "zero"-position reproducibility during said withdrawing phase.

* * * * *